United States Patent [19]
Erickson

[11] Patent Number: 5,355,122
[45] Date of Patent: Oct. 11, 1994

[54] RAINFALL DETECTION AND DISABLE CONTROL SYSTEM

[76] Inventor: Gary A. Erickson, 221 Lois Dr., Louisville, Colo. 80027

[21] Appl. No.: 918,845

[22] Filed: Jul. 24, 1992

[51] Int. Cl.$^5$ .............................................. G08B 21/00
[52] U.S. Cl. .................... 340/602; 340/620; 340/618; 137/78.2; 137/392; 239/65
[58] Field of Search ................ 239/63, 64, 65, 69, 239/67, 70; 137/78.2, 392; 340/602, 618

[56] References Cited

U.S. PATENT DOCUMENTS

| | | | |
|---|---|---|---|
| 3,823,874 | 7/1974 | Kroeck | 239/65 |
| 4,130,382 | 12/1978 | Bode | 417/12 |
| 4,190,884 | 2/1980 | Medina | 364/104 |
| 4,197,866 | 4/1980 | Neal | 137/1 |
| 4,246,574 | 1/1981 | Sanner | 340/602 |
| 4,541,446 | 9/1985 | Hogan | 137/2 |
| 4,613,764 | 9/1986 | Lobato | 307/116 |
| 4,684,920 | 8/1987 | Reiter | 340/310 A |
| 4,922,433 | 5/1990 | Mark | 364/510 |
| 4,993,640 | 2/1991 | Baugh | 239/64 |
| 5,060,859 | 10/1991 | Bancroft | 239/64 |
| 5,097,861 | 3/1992 | Hopkins et al. | 137/78.3 |

*Primary Examiner*—John K. Peng
*Assistant Examiner*—Tim Johnson

[57] ABSTRACT

Disclosed in a Rainfall Detection and Disable Control System which provides detection and a visual display of both a trace level and a variable accumulation level of natural rainfall. The dual interacting rainfall detection system provides a unique sprinkler system control function that disables sprinkler system watering both during and after a rain shower, based upon the amount of rainfall accumulation, and user selectable disable time periods. A short variable disable time period is initiated by the trace rainfall detection probe and a long variable time period is initiated by the accumulation rainfall detection probe. The trace rainfall detection probe provides the control function of preventing watering, at the onset of, and during a rain shower. The short disable time period of the trace detection function allows the next watering cycle to occur, if no significant rainfall accumulation is detected. The adjustable accumulation rainfall detection level and the long disable time period of the accumulation detection function prevents the next watering cycle from occurring if sufficient natural rainfall has occurred. The 2 probes and their individual positions in the rain gage along with their separate disable time periods provide versatile lawn watering control. It allows the user to prevent watering during a rain shower, and allows the user to chose the disable time period and rainfall accumulation level the best suits his type of turf and programmed watering cycle.

1 Claim, 3 Drawing Sheets

RAINFALL DETECTION AND DISABLE CONTROL SYSTEM

BACKGROUND OF THE INVENTION

This invention relates to an electronic Rainfall Detection and Disable Control System that connects to a time cycled programmable lawn sprinkler systems, and more particularly to such devices which allow the user of the device to set the rainfall detection levels and disable duration times for a lawn sprinkler system. This device automatically disables a lawn sprinkler system for electronically selectable periods of time at associated selected levels of electronically detected rainfall, and therefore, prevents watering cycles during and after periods of natural rainfall. This device automatically facilitates appropriate water conservation and watering maintenance of a lawn with a minimum amount of supplemental watering.

A programmable lawn sprinkler system automatically applies a specified amount of water to a lawn at regular intervals. During periods of significant rainfall a lawn sprinkler system will over water a lawn, potentially damaging the lawn and wasting water that could be conserved.

Most lawn sprinkler systems can be manually disabled during periods of adequate rainfall and manually enabled during periods of inadequate rainfall. Inconsistent manual control of the lawn sprinkler system disable function (a switch) can damage a lawn by applying too much or too little water.

Although I have not conducted a search, I feel that there is need in the art for a device that will regulate watering cycles by electronically disabling a lawn sprinkler system for selected times based on detected levels of rainfall.

SUMMARY OF THE INVENTION

It is an object of the invention to collect rainfall in a calibrated container with two user selectable mounting methods both facilitating easy detachment for the removal of rain.

It is another object of the invention to use a grid cover over the collection container to prevent debris from accumulating in the container.

Another object of the invention is to have both a fixed level and adjustable level rainfall detection probemounts built into the calibrated rainfall collection container.

Still another object of the invention is to allow the user of the invention to set the rainfall detection probe level in the calibrated collection container for the adjustable probe-mount.

A further object of the invention is to allow the user of the invention to select the disable time interval associated with rainfall detection at both the fixed position and the adjustable position rainfall detection probes by adjusting a potentiometer that controls the clock frequency of the disable timer/counter circuit.

Still a further object of the invention is to disable a sprinkler system for the time intervals selected by the user that will best meet the watering needs for the type of lawn being maintained.

Another object of the invention is to provide a system that will automatically enable or disable a lawn sprinkler system to provide consistent watering for proper lawn maintenance and promote water conservation.

It is another object of the invention to provide such a system that the user will be free from monitoring rainfall amounts and manually disabling or enabling a lawn sprinkler system to compensate for natural rainfall.

A further object of the invention is to allow installation of the invention in a secure location (basement, garage or locked utility box etc. . . .) near the sprinkler system control box to discourage vandalism and theft of the invention.

Still another object of the invention to obtain electrical power for the invention from the 24 VAC transformer of the lawn sprinkler system to which the invention is connected.

Another object of the invention is to put only a small appendage of the invention hardware at risk of vandalism and theft by exposing only the rainfall collection container and connecting cables to an unsecured environment.

Still another object of the invention is to allow the sprinkler system to remain enabled in the event of loss of power to the invention or theft of the collection container and cable.

A further object of the invention is to disable the sprinkler system without effecting the selected watering cycle of the lawn sprinkler system by splicing the normally closed contacts of the Rainfall Detection and Disable Control System into the common return wires for all water zone solenoids that control the water flow to each sprinkler head.

Still another object of the invention is to have the fixed water detection probe placed at the bottom of the rainfall collection container to facilitate the detection of trace amounts of rainfall and disable the lawn sprinkler system from watering during and immediately after periods of trace amounts of rainfall.

A further object of the invention is to use a shallow (approximately one-inch-deep) rain collection container to allow for natural evaporation of accumulated rainfall.

And finally, another object of the invention is compose the collection container of nonconductive plastic material that will not degrade from exposure to sunlight (non-UV sensitive) and will not crack when rain water freezes in the container.

The above and other objects of the invention are accomplished in a system with a calibrated rainfall collection container two water detection probes and associated circuitry which detects the presents of rain at selectable levels in the container. When rain is detected at the set probe levels in the container, the probes and associated circuitry illuminate an LED (Light Emitting Diode, one for each probe) and open a normally closed relay disabling the sprinkler system. When the water in the container evaporates to a level below the probe settings, the clock-counter circuits start a disable time intervals that continue to illuminate the LEDs and hold the relay open for the selected time periods. At the end of the selected time periods, the LEDs extinguish and the relay closes re-enabling the lawn sprinkler system.

If electrical power to the invention fails or the rain collection container and cable are removed the sprinkler system remains enabled and the normal watering cycle is not interrupted.

The disable time interval of the clock-counter circuit is controlled by a potentiometer that varies the resistance value of the RC (Resistor Capacitor) time constant for the clock frequency of the clock-counter circuits. In this manner the clock frequency is inversely proportional to the duration of the disable times. Time scales are assigned to the potentiometer that varies the resistance value in ohms and controls the duration of disable times.

The normally closed contacts of the relay are spliced into the common return wires for all zone control solenoids of the lawn sprinkler system. The programmed cycle of lawn sprinkler system is not effected by the disabled zone control solenoids. The lawn sprinkler system continues its normal cycle with the Rainfall Detection and Disable Control System preventing the zone control solenoid from being energized and thus preventing water from flowing to the sprinkler heads.

BRIEF DESCRIPTION OF THE DRAWINGS

The above and other objects, features, and advantages of the invention will be better understood by reading the following more particular description of the invention, presented in conjunction with the following drawings, wherein:

FIG. 1 also shows the associated connecting cables, adjustable and fixed probe mounts and calibrated rain collection container with two mounting methods.

FIG. 2 also shows the water detection probes, the connecting cable, and their interface to both the detection circuitry and the rainfall collection container.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
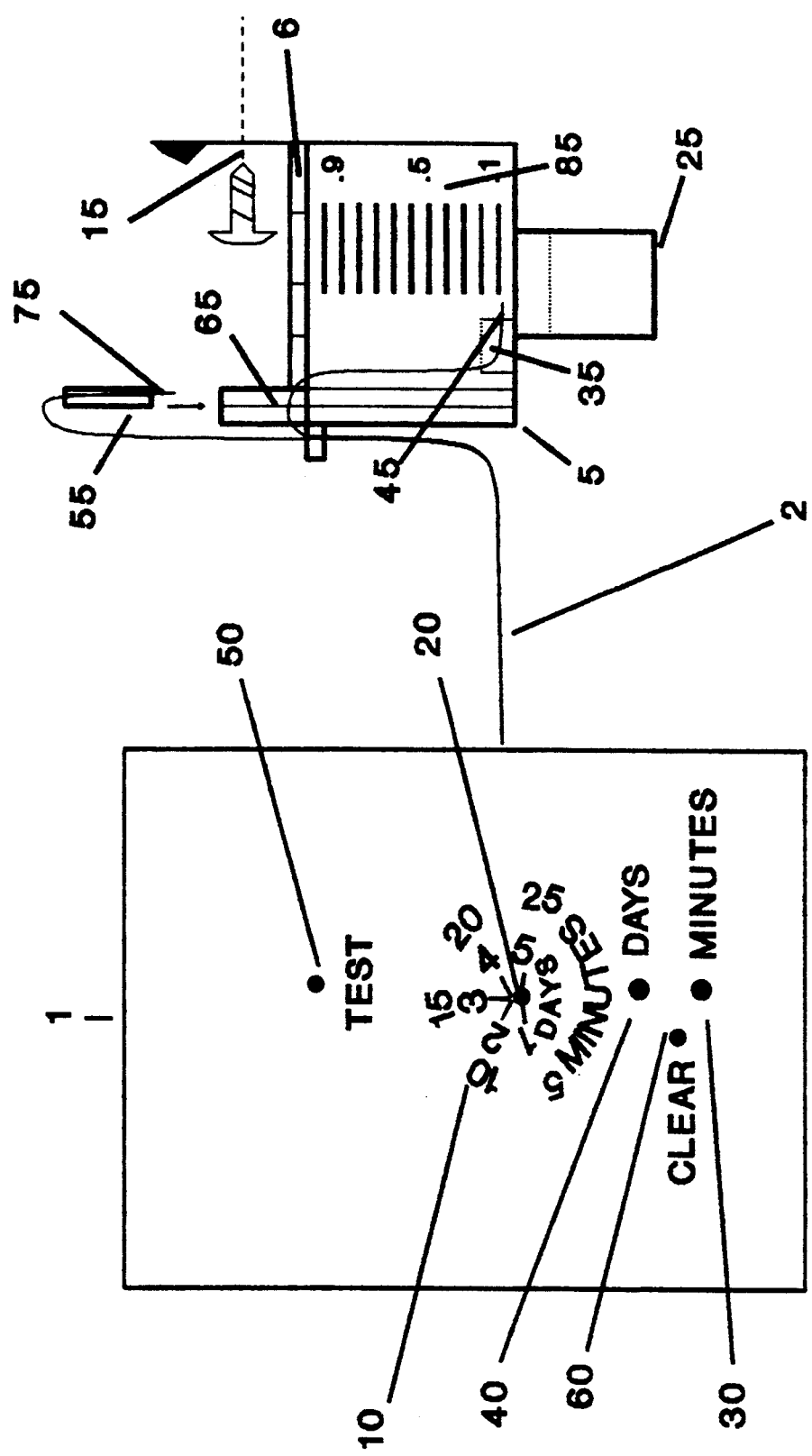
FIG. 1 shows an external view of the Rainfall Detector and Disable Control System. It shows the control enclosure with the calibrated potentiometer access hole, TEST switch and CLEAR switch access holes along with the dual level rainfall detection LEDs.

FIG. 1 shows a front view of the enclosure 1 for the Rainfall Detector and Disable Control System. Referring now to FIG. 1, the Rainfall Detector and Disable Control System enclosure 1 contains a scale 10 which is calibrated in disable times for both minutes and days. A potentiometer 20 (beneath the access hole) is attached to a resistor network (not shown) and is used to adjust the resistance value for controlling the clock frequency for the counter integrated circuits which counts the number of cycles that determine disable time intervals for the desired number of minutes/days for both detection probes.

FIG. 1 also shows two Light Emitting Diodes (LEDs) 30 and 40 that illuminate to indicate the detection of water at each probe and the initiation of each disable interval. FIG. 1 also illustrates a TEST switch 50 located beneath the access hole. Momentarily pressing this TEST switch 50 initiates the disable function for both clock/counter disable time intervals and illuminates both LEDs 30 and 40 to verify correct operation of the disable function.

FIG. 1 further illustrates a CLEAR switch 60 located beneath the access hole. Momentarily pressing this CLEAR switch 60 terminates all disable time intervals and extinguishes the illuminated LEDs 30 and 40 if water is not present at the detection probes.

The Rainfall Detector and Disable Control System automatically tests the counter/timer circuit disable function by illuminating both LEDs 30 and 40 when power is applied to the system. The clear switch 60 is then momentarily pushed after the automatic power-on counter/timer function test to extinguish both LEDs 30 and 40 and initialize the system to the enable mode.

FIG. 1 also shows the detection probe connecting cable 2 and calibrated rainfall collection container 5 with a grid cover 6 and with two methods of mounting 15 or 25 for easy detachment to facilitate the removal of rain from the container. The fixed detection probe mount 35 located at the bottom of the collection container is for securing probe number one 45. The adjustable detection probe mount 55 has an interlocking dovetail and mortise 65 allowing the slide positioning of probe number two 75 at calibrated levels 85 within the rainfall collection container.

Figure 2:
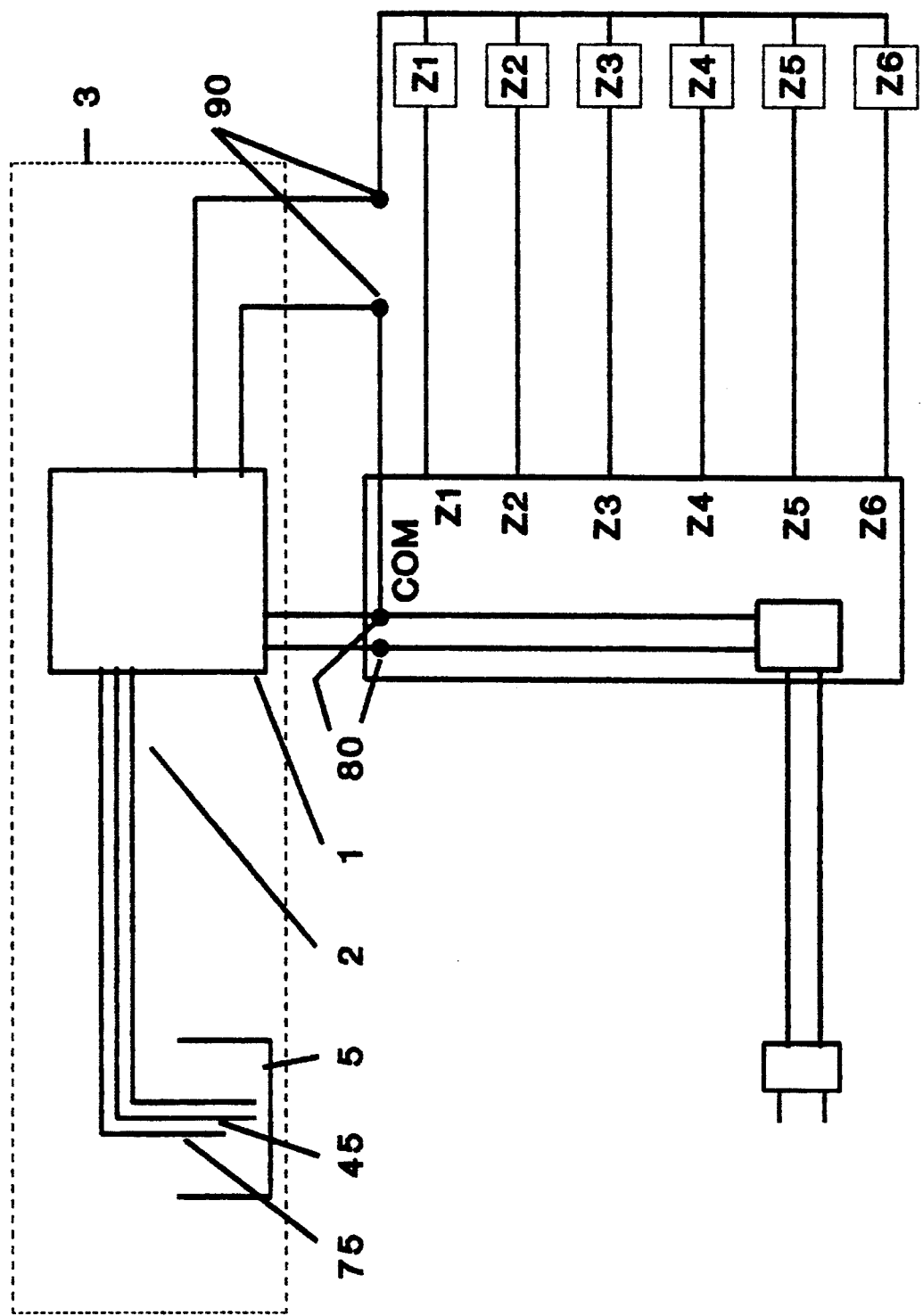
FIG. 2 shows a block diagram of the Rainfall Detector and Disable Control System and shows the connections to the lawn sprinkler system for the 24 volt AC electrical power and the connecting splice into the 24 volt AC common solenoids zone control line.

Referring now to FIG. 2. This block diagram shows the sprinkler system and its interface to the Rainfall Detector and Disable Control System 5 (bounded by dotted lines). The diagram illustrates the twenty-four volt AC power connections 80 from the sprinkler systems transformer to the Rainfall Detector and Disable System. FIG. 2 further shows the splice connection 90 of the twenty-four volt AC common return from the sprinkler system zone control solenoids to the Rainfall Detector and Disable Control System. FIG. 2 also shows the interface of the water detection probes 45 and 75 to the calibrated rain collection container 5 and the connecting cable 2 to the detection and disable control enclosure 1.

Figure 3:
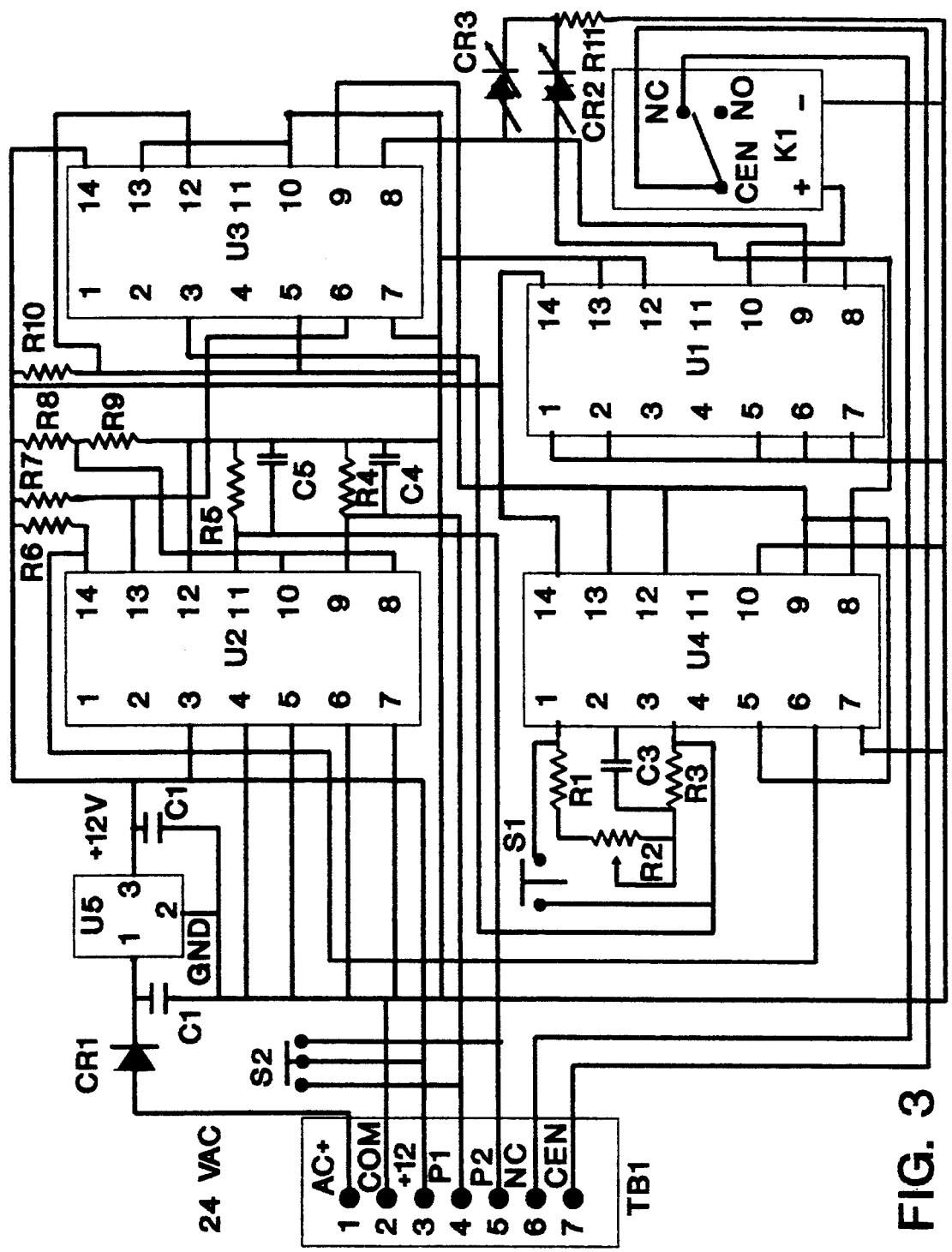
FIG. 3 shows a circuit schematic diagram of the electronics and logical function of the Rainfall Detector and Disable Control System.

Referring now to FIG. 3. This schematic diagram shows the seven external connections inside the control enclosure at Terminal Board one (TB1) and the interconnects of the electronic components. Table 1 contains a complete list of the components identified in the schematic and their commercial part number. A reference to the specifications of the integrated circuits (U1–U5) is included in Appendix A of this document.

The twenty-four volt AC common power line (COM) from the sprinkler system transformer is connected to location 2 at TB1 (the connection point is denoted as TB1-2). TB1-2 acts as both the AC common and the DC ground for the control circuit. The twenty-four volt AC hot power line (AC+) is connected to location TB1-1. TB1-1 is connected to the anode of CR1 (diode rectifier) and the cathode of CR1 is connected to the positive (+) terminal of C1 (filter capacitor) and pin 1 of U5 (12 volt DC positive voltage regulator). Pin 3 of U5 (U5-3) is connected to the positive (+) terminal of C2 (filter capacitor), pin 2 of U5 (U5-2) and the negative (−) terminals of C1 and C2 are connected to TB1-2 the DC ground. CR1, C1, U5 and C2 create a power supply that converts the twenty-four volts AC from the sprinkler systems transformer to 12 volts DC, providing power to the integrated circuits at U1-14, U2-3, U3-14 and U4-14. The ground pins of the ICs U1-7, U2-12, U3-7, U4-7 are connected to the common AC and DC ground terminal at TB1-2.

The external water detection probe connections are made at TB1-3, TB1-4 and TB1-5. TB1-3 is a +12 volts DC probe reference, TB1-4 is probe 1 (P1) and TB1-5 is probe 2 (P2). Probe 1 TB1-4 (P1) is connected to the (+) comparator IC input U2-9, R4 (resistor) and C4 (capacitor). Probe 2 TB1-5 (P2) is connected to another (+) comparator IC input U2-11, R5 and C5. U2-8 and U2-10 are the (−) comparator inputs. These inputs are connected to a reference voltage provided by the voltage divider network of R8 and R9. The presents of water at the selected probe levels in the rainfall collection container (see FIG. 2) creates a low resistance path between +12 volts DC reference probe TB1-3 and the water detection probes TB1-4 (P1) or TB1-5 (P2). This results in a higher voltage at the comparator's (+) input than the reference voltage at the comparator's (−) input and the comparator function (the voltage at the (+) pin is greater than the voltage at the (−) pin) drives the respective output pin U2-14 (P1) and U2-13 (P2) to a logic high (+12 volts DC) through the respective pull-up resistor R6 (P1)or R7 (P2).

A logical high at the output of the comparator for probe 2 U2-13 (P2) is propagated to the reset pin of the probe 2 counter/timer IC U3-6 (P2). A logical high at the output of the comparator for probe 1 U2-14 (P1) is propagated to the reset pin of the probe 1 counter/timer IC U4-6 (P1). When the reset input U3-6 (P2) is driven high, the output pin U3-8 (P2) is driven to a logical high state and the LED CR3 is illuminates through R11 that is connected to ground. When the reset input U4-6 (P1) is driven high, the output pin U4-8 (P1) is driven to a logical high state and the LED CR2 is illuminated through R11 that is connected to ground. When the water in the rainfall collection container evaporates below the probe levels, the respective input reset pins U3-6 (P2) and U4-6 (P1) return to a logical low state (ground) and the counting function of the respective ICs hold their output pins U3-8 (P2) and U4-8 (P1) high and illuminate CR3 and CR4 for their respective selected number of count cycles.

The number of count cycles selected for each counter/timer IC U3 and U4 is determined by the state of the count select input pins 12 and 13. The probe 1 disable cycle count of U4 is set to $2^{15}$ (32768) cycles by applying a logical high to U4-12 and U4-13. This is accomplished by the connection of these count control pins to the pull-up resistor R10. The probe 2 disable cycle count of U3 is set to $2^7$ (128) cycles by applying a logical high to U3-13 and a logical low to U3-12. This is accomplished by-the connection of these count control pins to the pull-up resistor R10 and ground.

The logical OR function of U1 allows either counter/timer IC output U3-8 or U4-8, connected to U1-9 and U1-8 respectively, to drive the normally closed relay K1 into its open position through the output of U1-10 and therefore disable the sprinkler system common solenoid zone control return line that is splice connected through the relay's center pole and normally closed contacts at TB1-6 and TB1-7.

The disable times for the counter/timer ICs U3 and U4 are determined by their respective selected count cycles and the common clock frequency created by the RC (Resistor Capacitor) time constant of R1 R2 and C3.

Each disable time is defined by the following equations:

$$\text{Disable Time} = \frac{\text{Selected Cycle Count}}{\text{Clock Frequency}}$$

Where $$\text{Clock Frequency} = \frac{1}{2.3 * (R1 + R2) * C3}$$

Momentarily pressing the CLEAR switch (S1) clears the clock/counter outputs at U3-8 and U4-8 (low) and terminates any pending count cycles by shorting the pins of the RC network at U4-1 and U4-3.

Momentarily pressing the TEST switch (S2) sets the clock/counter outputs at U3-8 and U4-8 high and initiates count cycles at both U3 and U4 by shorting the Probe connections TB1-4 and TB1-5 of the water detection network to the +12 volts dc reference at TB1-3.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| ID NAME | ID # | DESCRIPTION | PART # | QTY |
|---|---|---|---|---|
| Box | 1 | Enclosure | N/A | 1 |
| Cable | 2 | Twisted (3) 22 ga. jacketed | N/A | 25 ft |
| Calibrated Container | 5 | Rain collection & probe mtg | N/A | 1 |
| C1 | 100 | Filter Capacitor 100 uf 50 VDC | ECE-B1HU101 Panasonic | 1 |
| C2, C3 | 101 | Filter Capacitor 10 uf 50 VDC | ECE-B1HU100 Panasonic | 2 |
| C4, C5 | 102 | Capacitor .1uf 25 VDC | ECK-F1E104ZVE Panasonic | 2 |
| CR1 | 103 | Diode rectifier | 1N4002 | 1 |
| CR2, CR3 | 104 | LED | LN28RP Panasonic | 2 |
| K1 | 105 | Relay 12vdc | 5GL-112P-PS-DC12 OMRON | 1 |
| R1 | 106 | Resistor 120KΩ | | 1 |
| R2 | 107 | Potentiometer 500KΩ | Panasonic EVN-D1AA00B55 | 1 |
| R3 | 108 | Resistor 1MΩ | ¼ Watt 5% | 1 |
| R4, R5 | 109 | Resistor 3MΩ | ¼ Watt 5% | 2 |
| R6, R7 | 110 | Resistor 10KΩ | ¼ Watt 5% | 2 |

TABLE 1-continued

Schematic Parts List

| ID NAME | ID # | DESCRIPTION | PART # | QTY |
|---|---|---|---|---|
| R8 | 111 | Resistor 5KΩ | ¼ Watt 5% | 1 |
| R9 | 112 | Resistor 20KΩ | ¼ Watt 5% | 1 |
| R10, R11 | 113 | Resistor 1KΩ | ¼ Watt 5% | 2 |
| S1 | 114 | Push switch SPST | Panasonic EVQ-QS507K | 1 |
| S2 | 115 | Push switch DPST | C & K L201011SS03Q | 1 |
| TB1 | 116 | Terminal board (7) | ED1601 (OEM) | 1 |
| U1* | 117 | Quad 2 input OR | CD4071 National | 1 |
| U2* | 118 | Quad 2 input Comparator | LM339M National | 1 |
| U3, U4* | 119 | Programmable timer | CD4541 National | 2 |
| U5* | 120 | +12 voltage reg | LM7812C National | 1 |

Parts available through Digi-Key Corporation
*see appendix for integrated circuits specifications

What is claimed is:

1. A dual function Rainfall Detection and Disable Control System for interfacing to an existing lawn sprinkler clock controller providing to the user water conservation that prevent watering both during and after a rain shower, said system comprising:

means for collecting natural rainfall with dual internal detection means mounted therein;

said dual internal detection means comprising trace rainfall detection means and variable level accumulation rainfall detection means;

said trace rainfall detection means includes a probe mounted near the bottom of said rainfall collecting means;

said trace rainfall detection means having a short selectable sprinkler system disable time;

said means for variable level accumulation rainfall detection includes a probe adjustably mounted in said rainfall collecting means;

said means for variable level accumulation rainfall detection having a long selectable sprinkler system disable time;

control means for the interaction of disable times of said trace rainfall detection and accumulation rainfall detection means; control means for tandem control of the time intervals for both said short selectable sprinkler system disable time and said long selectable sprinkler system disable time;

means visually displaying the detection of rainfall collected in said collecting means by both the trace rainfall detection means and the accumulation rainfall detection means with separate light emitting diodes, respectively;

control means for remotely testing both the trace and accumulation rainfall detection means and the visual display means;

control means for remotely clearing said remote control testing means of the dual internal detection means.

* * * * *